Nov. 8, 1938.   E. C. BALLMAN   2,135,785
ELECTRIC MOTOR MOUNTING
Filed March 21, 1936
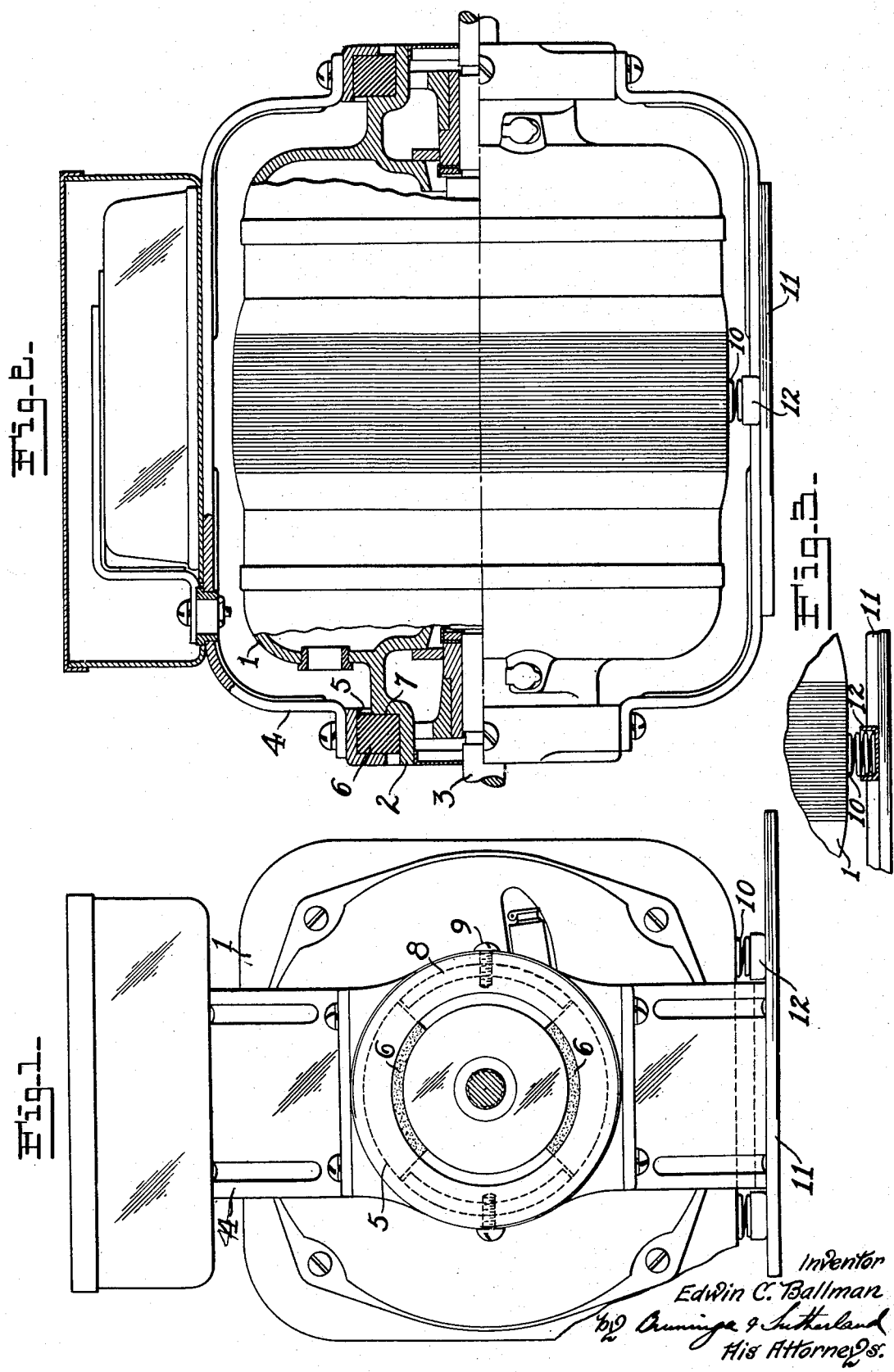
Inventor
Edwin C. Ballman
by Cummings & Sutherland
His Attorneys Patented Nov. 8, 1938

2,135,785

UNITED STATES PATENT OFFICE 2,135,785

ELECTRIC MOTOR MOUNTING

Edwin C. Ballman, St. Louis, Mo.

Application March 21, 1936, Serial No. 70,088

2 Claims. (Cl. 248—26)

This invention pertains to a mounting for electric motors such as to take up vibration and to prevent the transmission of noise from the motor to the structure upon which it is mounted.

One of the objects of this invention is to provide a mounting whereby the motor may be accurately but resiliently retained in alinement as to its shaft so that vibration of the motor may be permitted without transmitting such vibration to the supporting structure.

Another object is to provide such a mounting which will not only resiliently maintain the motor in alinement but which will absorb the torque reaction in such a manner as to avoid transmitting torque variation or circumferential vibration to the supporting structure.

Another object is to provide such a mounting adapted to maintain the motor resiliently in alinement whereby the alining element may be relieved of the weight of the motor.

Further objects will appear from the following description taken in connection with the accompanying drawing, in which:—

Figure 1 is an end view of a motor mounting embodying this invention;

Figure 2 is a side view partly in section of the mounting shown in Figure 1; and Figure 3 is a detail view partly in section illustrating means for resiliently supporting the weight of the motor.

In the embodiment of the invention illustrated in the drawing, the motor is provided with a frame 1 which may be provided with trunnions 2 embracing the shaft 3. A supporting base 4 is provided at each end with an annular seat 5 adapted to receive one or more resilient pads 6 adapted to receive the trunnions 2 and to seat against a radial shoulder 7 thereof.

The pads 6 may be formed as complete rings surrounding the trunnions 2, or they may be formed as sectors as shown in Figure 1. In the latter case they may be retained against circumferential movement by spacers 8 secured against the seat 5 by screws 9, or other suitable fasteners.

Since, in the embodiment illustrated, the structure just described is duplicated at the opposite end of the frame 1, the structure at that end need not be further described.

It will be noted that this structure provides a motor suspension in which the motor frame is resiliently retained by the pads 6 in constant alinement as to the axis of its shaft 3. At the same time the motor is only frictionally retained against rotation so far as this portion of the mounting is concerned.

In order to take up the torque reaction of the motor and also to support its weight so as to relieve the pads 6 of the weight of the motor, resilient supporting members such as springs 10 are mounted between the motor frame and the bottom plate 11 of the supporting base 4. The springs 10 are preferably two or more in number and are spaced laterally of the vertical plane through the axis of the motor shaft so as to resist rotation of the motor frame. These springs 10 may be seated in cups 12, welded or otherwise secured to the bottom plate 11. The combined strength of the springs 10 is preferably adjusted so as to substantially equal the weight of the motor so that practically this entire weight is carried by the springs 10 and is not placed upon the pads 6 to appreciable extent.

It will be seen that by this structure the pads 6 are called upon only to provide for maintaining the alinement of the shaft. These pads are preferably of rubber so that accurate alinement may be maintained while at the same time resiliency is provided to permit vibration. The torque reaction is taken care of entirely by the springs 10 which not only carry the entire weight of the motor but prevent rotation thereof, under the torque reaction. The springs, being resilient, are adapted to take up variations in the torque reaction and, therefore, to absorb any tendency to circumferential vibration. Accordingly any vibration or noise originating in the motor may be absorbed by these resilient suspension devices and the transmission thereof to the supporting structure is avoided.

It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In an electric motor having a shaft, a motor frame having a trunnion, a supporting base having an annular centering member embracing said trunnion, a resilient pad between said trunning and said centering member, and resilient supporting elements between said base and said frame positioned laterally of said shaft adapted to absorb the torque reaction of the motor and adjusted to substantially balance the suspended weight of said frame and the motor parts carried thereby so as to relieve said trunnion of such weight.

2. In a motor of the character described having a shaft, a motor frame having a pair of trunnions, a support, resilient centering means engaging said support and said trunnions adapted to center said shaft relatively to said support, and spring means between said frame and said support acting non-radially and vertically with respect to said shaft adapted to partially support said frame and absorb the torque reaction thereof.

EDWIN C. BALLMAN.